N. Trowbridge.
Washing Mach.
N° 77,417. Patented Apr. 28, 1868.
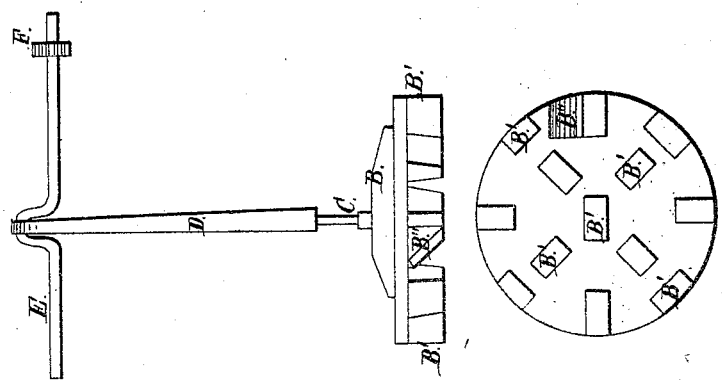
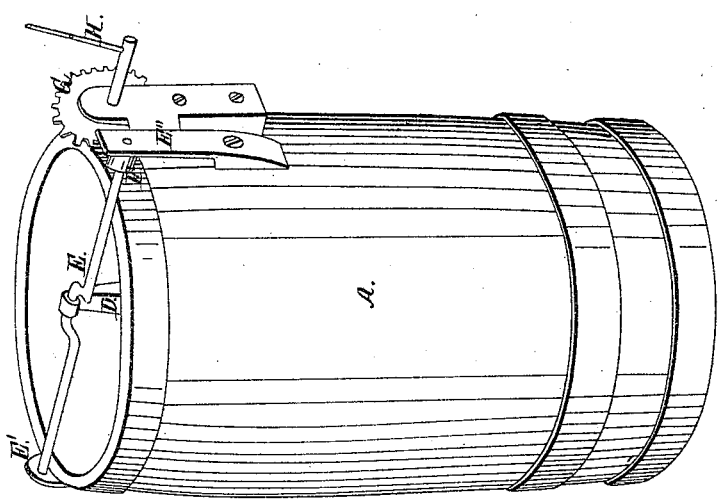
Witnesses.
Chas F. Clausen
N. B. Clark
Inventor.
Newton Trowbridge
by
D. S. Holloway
his atty.

United States Patent Office.

NEWTON TROWBRIDGE, OF TULLY, NEW YORK.

Letters Patent No. 77,417, dated April 28, 1868.

IMPROVED WASHING-MACHINE.

The Schedule referred to in these Letters Patent and making part of the same.

TO ALL WHOM IT MAY CONCERN:

Be it known that I, NEWTON TROWBRIDGE, of Tully, in the county of Onondaga, and State of New York, have invented a new and useful Improvement in Washing-Machines; and I do hereby declare that the following is a full, clear, and exact description of the same, reference being had to the annexed drawings, making part of this specification, in which—

Figure 1 is a perspective view.
Figure 2 is an elevation of the pounder.
Figure 3 is a plan of the bottom.

The same letters are employed in all the figures in the indication of the same parts.

A is a barrel, open at one end, and having the inside of equal diameter throughout its entire length. The pounder, B, is fitted neatly into this barrel. It is constructed with projections $B^1$ from its lower face. These projections taper towards their lower ends, forming wedges, between which the clothes are compressed as the pounder is pressed down. One of these projections, $B^2$, is inclined, as shown, to form an inclined plane, which, pressing against the clothes, will cause the pounder to revolve slightly with each stroke.

The pounder is attached to a shank, C, which has a head on its lower end, held by the plate on top of the pounder, through which the shank passes, so as to permit the pounder to turn freely thereon. This shank is inserted into the lower end of the rod, D, and fastened by a pin passing through one of a series of holes, so as to permit the pounder to be adjusted according to the amount of clothes in the barrel. The rod D is attached by a strap to a crank in the shaft E, placed on top of the barrel. The shaft E has its bearings in lugs $E^1$ $E^2$, attached to the top of the barrel. The lug $E^2$ is a spring, which may be bent, so as to permit the end of the shaft to be withdrawn. F is a pinion on the shaft, driven by a spur-wheel, G, which receives a reciprocating motion from the lever H, so that the pounder shall make a stroke with each movement of the lever in either direction.

What I claim as my invention, and desire to secure by Letters Patent, is—

1. The combination of the barrel A and reciprocating pounder B, constructed with wedge-formed projections $B^1$ and an inclined projection, $B^2$, substantially as and for the purpose set forth.

2. The combination of the barrel A, the pounder B, the shank C, rod D, crank E, spring-lug $E^2$, pinion F, spur-wheel G, and lever H, all arranged to operate substantially as set forth.

In testimony whereof, I have signed my name to this specification in the presence of two subscribing witnesses.

NEWTON TROWBRIDGE.

Witnesses:
CONE WILLIAMS,
L. D. TROWBRIDGE.